(12) United States Patent
Bagaoisan et al.

(10) Patent No.: US 7,543,371 B2
(45) Date of Patent: Jun. 9, 2009

(54) APPARATUS FOR A DISK DRIVE ACTUATOR PIVOT SET HEIGHT TOOLING WITH AN ACTIVE SERVO COMPENSATION

(75) Inventors: David Joseph Bagaoisan, Santa Clara, CA (US); Steven Hanssen, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 483 days.

(21) Appl. No.: 10/874,942

(22) Filed: Jun. 23, 2004

(65) Prior Publication Data

US 2005/0280918 A1 Dec. 22, 2005

(51) Int. Cl.
*G11C 5/12* (2006.01)
*G11B 5/127* (2006.01)

(52) U.S. Cl. .................. 29/737; 29/729; 29/603.03; 29/603.04; 29/593; 219/121.82; 219/121.83; 360/75; 356/634; 356/635

(58) Field of Classification Search .............. 29/729, 29/737, 603.03, 603.04, 603.05, 603.1, 593; 356/496, 500, FOR. 118, FOR. 119, 625, 356/634, 635; 83/298; 219/121.82, 121.83; 360/75, 137, 271.1, 271.6
See application file for complete search history.

(56) References Cited

U.S. PATENT DOCUMENTS

| | | | |
|---|---|---|---|
| 3,899,663 A * | 8/1975 | Pirlet | 356/635 X |
| 4,114,489 A * | 9/1978 | Schneider et al. | 83/298 |
| 5,404,636 A | 4/1995 | Stefansky et al. | |
| 5,539,597 A | 7/1996 | Blanks | |
| 5,552,888 A * | 9/1996 | Sogard et al. | 356/500 |
| 5,557,490 A | 9/1996 | Jabbari | |
| 5,563,749 A | 10/1996 | Bicknese et al. | |
| 5,731,934 A | 3/1998 | Brooks et al. | |
| 5,754,364 A | 5/1998 | Tanaka et al. | |
| 5,754,372 A | 5/1998 | Ramsdell et al. | |
| 5,818,665 A | 10/1998 | Malagrino, Jr. et al. | |
| 5,864,441 A | 1/1999 | Coffey et al. | |
| 5,894,382 A | 4/1999 | Hyde | |
| 5,983,485 A | 11/1999 | Misso | |
| 6,018,441 A | 1/2000 | Wu et al. | |
| 6,163,441 A | 12/2000 | Wood et al. | |
| 6,178,618 B1 | 1/2001 | Heim et al. | |
| 6,288,879 B1 | 9/2001 | Misso et al. | |

(Continued)

FOREIGN PATENT DOCUMENTS

JP 4119575 4/1992

(Continued)

OTHER PUBLICATIONS

"Small Disk-to-Disk Spacing Heads Merging in Head/Disk Assembly", IBM Technical Disclosure Bulletin, Jun. 1994, 94A 61874/RO8930170, vol. 37, Pub. No. 6A, pp. 205-206.

*Primary Examiner*—A. Dexter Tugbang
(74) *Attorney, Agent, or Firm*—Bracewell & Giuliani LLP

(57) ABSTRACT

An automated system for setting the linear distance from a mounting surface of a pivot cartridge to critical features on actuator arms is disclosed. This distance is set to eliminate the tolerance incurred via normal manufacturing of these components. The system adjusts for every component to customize each actuator and/or pivot assembly to meet the functionality requirements for disk drives.

7 Claims, 2 Drawing Sheets

U.S. PATENT DOCUMENTS

| | | |
|---|---|---|
| 6,525,910 B1 | 2/2003 | Macpherson et al. |
| 6,655,847 B2 | 12/2003 | Obara et al. |
| 6,678,122 B2 | 1/2004 | Koyama |
| 2004/0042123 A1 | 3/2004 | Kasajima et al. |

FOREIGN PATENT DOCUMENTS

| | | | | |
|---|---|---|---|---|
| JP | 5-136023 | * | 6/1993 | ........ 356/FOR. 118 |
| JP | 626058 | | 4/1994 | |

* cited by examiner

APPARATUS FOR A DISK DRIVE ACTUATOR PIVOT SET HEIGHT TOOLING WITH AN ACTIVE SERVO COMPENSATION

BACKGROUND OF THE INVENTION

1. Technical Field

The present invention relates in general to an improved disk drive subassembly technique and, in particular, to an improved system, method, and apparatus for disk drive actuator pivot set height tooling with active servo compensation.

2. Description of the Related Art

Data access and storage systems generally comprise one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to five disks are stacked vertically on a common spindle that is turned by a disk drive motor at several thousand rpm. Hard disk drives have several different typical standard sizes or formats, including server, desktop, mobile, and microdrive.

A typical HDD is shown in FIG. 1. An information storage system, such as a magnetic hard disk file or drive 111 for a computer system, has an outer housing or base 113 containing at least one magnetic disk 115. Disk 115 is rotated by a spindle motor assembly having a central drive hub 117. An actuator 121 comprises a plurality of parallel actuator arms 125 (one shown) in the form of a comb that is pivotally mounted to base 113 about a pivot assembly 123. A controller 119 is also mounted to base 113 for selectively moving the comb of arms 125 relative to disk 115.

Each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly is head and the slider 129, which are mounted on suspension 127. The slider 129 is usually bonded to the end of suspension 127. The head is typically pico size and formed from ceramic or intermetallic materials. The head also may be femto size and is pre-loaded against the surface of disk 115 by suspension 127.

Suspensions 127 have a spring-like quality which biases or urges the air bearing surface of the slider 129 against the disk 115 to enable the creation of the air bearing film between the slider 129 and disk surface. A voice coil 133 housed within a conventional voice coil motor magnet assembly 134 is also mounted to arms 125 opposite the head gimbal assemblies. Movement of the actuator 121 (indicated by arrow 135) by controller 119 moves the head gimbal assemblies radially across tracks on the disk 115 until the heads settle on their respective target tracks. The head gimbal assemblies operate in a conventional manner and always move in unison with one another, unless drive 111 uses multiple independent actuators (not shown) wherein the arms can move independently of one another.

Currently, the installation of pivot assemblies in the block of the actuator is limited by the achievable machining tolerances of each component (e.g., the actuator and pivot cartridge assembly). Unfortunately, the stack-up tolerance increases with respect to the z-axis (i.e., the axis of the pivot and actuator) to pivot mounting surface which, in high density hard disk drives, drives much of the head instability seen in current disk drives. This would improve current efforts on arm-to-disk height measurements which has been linked to screening head instable drives.

Prior art solutions include shims of thin metal or plastic that are used to offset parts via the thicknesses of the shims. Shims have limitations in that the addition of more parts to solve tolerances only can minimize the tolerance incurred, but not eliminate it since it, too, is a fixed height. Adjusting tooling to compensate for trends based on basic measurements can only average out the tolerance on a population of parts. However, adjusting tooling cannot eliminate or actively customize each mating part since it is static and not dynamic as in the case of the present invention. As will be described for the present invention, an adjustable or dynamic set height is required to improve the yield loss due to instable heads, as well as reduce overall cost losses from both internal manufacturing processes and incoming supplier parts. Thus, an improved solution for adjusting the set height for actuator pivots would be desirable.

SUMMARY OF THE INVENTION

One embodiment of a system, method, and apparatus for a tooling concept for automated location system for setting the distance from the mounting surface of a pivot cartridge to the critical features on the actuator arms. This distance is set to always eliminate the tolerance incurred via normal manufacturing of these components, or set to a prescribed height that meets the hard disk drive (HDD) functionality requirements. This is done automatically to adjust for every component giving the present invention full capability to customize each actuator and/or pivot assembly to meet the functionality requirements for each HDD. As a result, the reliability and robustness of the HDD product is improved.

One advantage of using this idea for assembly tooling is that it's quite inexpensive and highly accurate. Typically, most pivot assemblies use either a hard stop (e.g., a flange-type design) or a screw attach (e.g., set screw or pull screw) that have their drawbacks. Flange-type pivot assemblies require specialized shims to adjust their height relative to the actuator arms. Even shims are static rather than dynamic so the tolerance incurred is always a function of how accurately the shims can be made. In addition, shims add cost to the overall design since it is an additional part number to the drive.

Screw attach pivot assemblies allow for adjustability, but the current tooling incurs tolerance again based on a fixed point on the tooling that is not dynamically adjustable like the present invention. Adjustable tooling via micrometers does not have the resolution to accurately dial tolerances in a high production setting. In addition, both of these prior art solutions add cost to the parts as well as the overall manufacturing cost.

In one solution, a probe, such as a laser-based measurement system, has a voltage output that is linear along a tolerance of +/−0.015 mm. This voltage is monitored and corrected to obtain a nominal voltage equal to whatever offset that an application requires. Although a laser-based measurement system is mentioned, it is interchangeable with any device that can take measurements and translate it to an electrical output. This device allows for individual part designs to have looser tolerances since critical dimensions to function are customized to nominal or to any prescribed dimension. This system eliminates tolerance stack-up due to pivot set height.

In one embodiment, a potentiometer is used to adjust target set height via a change in current settings. The present invention can be implemented on an HDD manufacturing line at the pivot installation station. It works by using the height measured using a probe that can take height measurements and translate them to electrical output, and feeding this information to a controller. The controller regulates the power to the positioning system which adjusts the pivot relative to the output of the probe. Once the positioning system adjusts the pivot shaft to the correct or desired height, the system stops and signals the operator or machine to lock the pivot into place.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
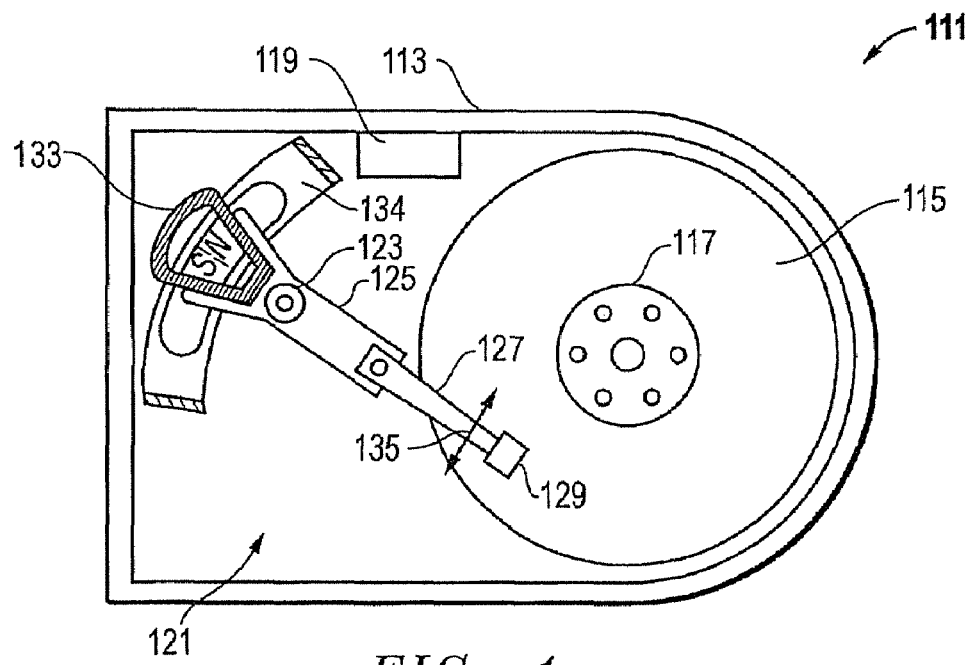
FIG. 1 is a plan view of a conventional disk drive.
Figure 2:
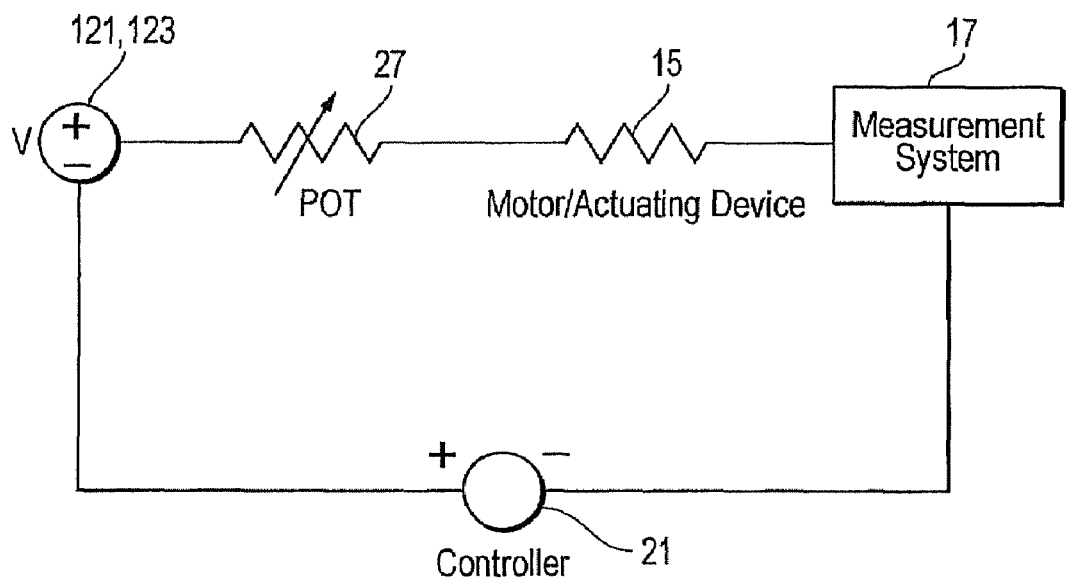
FIG. 2 is a circuit diagram of one embodiment of pivot set height tooling constructed in accordance with the present invention.
Figure 3:
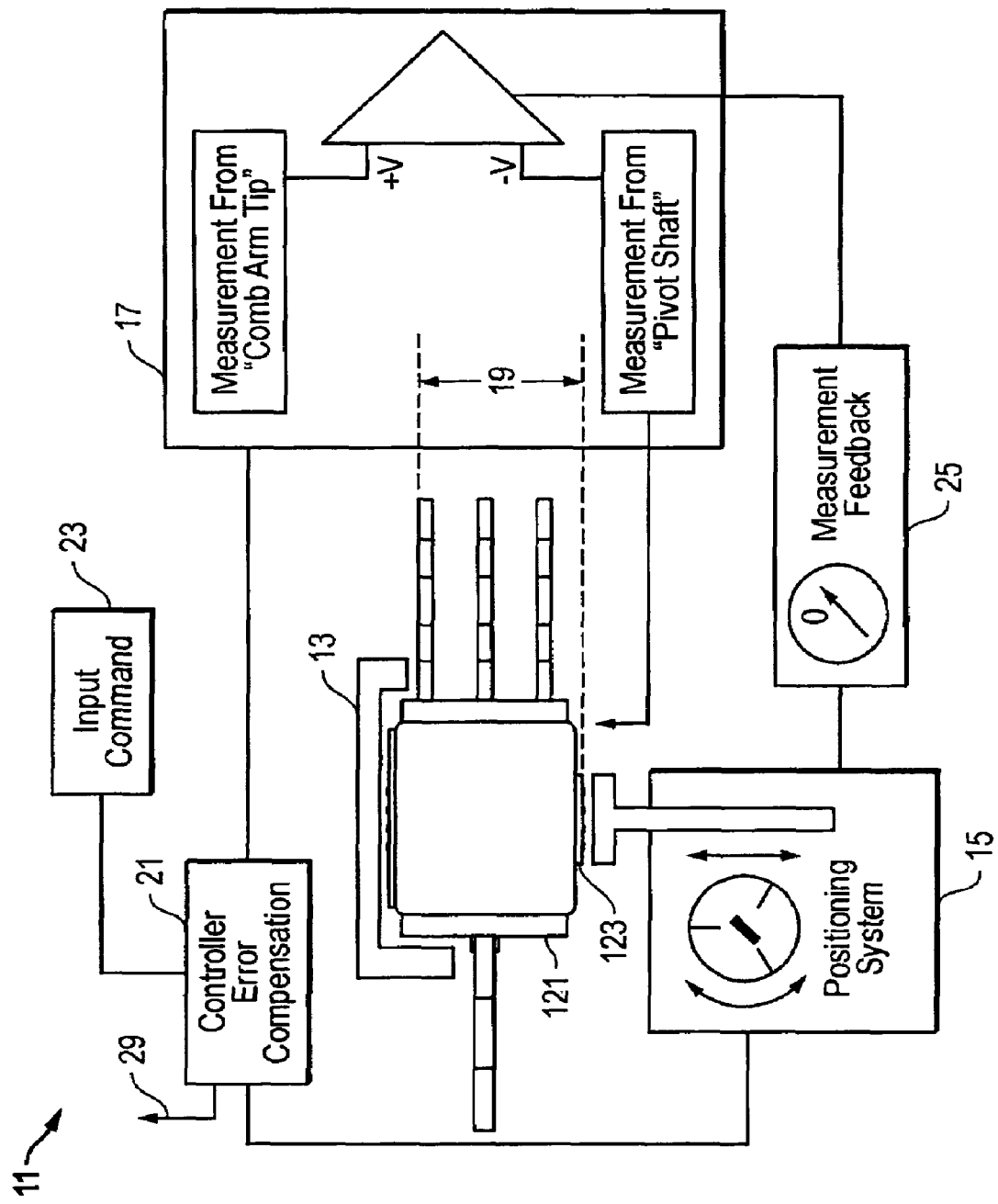
FIG. 3 is a schematic block diagram of the tooling of FIG. 2 and is constructed in accordance with the present invention.

Referring to FIGS. 2 and 3, one embodiment of an apparatus, method, and system 11 for dynamically adjusting a set height of a pivot 123 relative to an actuator 121 is shown. One embodiment of the system 11 comprises a fixture 13 (shown schematically) for restraining the body or block of the actuator 121. Fixture 13 also could be used to restrain the pivot 123 instead.

A positioning system 15 is used to move the pivot 123 relative to the actuator 121. However, if pivot 123 is restrained, positioning system 15 moves the actuator 121 relative to the pivot 123. The positioning system 15 sets a distance 19 (e.g., set height) from a mounting surface of the pivot 123 to a critical feature (e.g., an arm surface) on the actuator 121, such that the distance 19 is set to eliminate a tolerance stack-up between the pivot 123, the actuator 121, and any other intervening components.

A measurement system 17 is used for measuring the set height 19 of the pivot 123 relative to the actuator 121. The measurement system 17 may comprise, for example, a laser-based measurement system and has a voltage output that is linear along a tolerance of about +/−0.015 mm, for example, and is monitored and corrected by the controller 21 to obtain a nominal voltage equal to whatever offset (i.e., change in set height) is required between the pivot 123 and the actuator 121.

A controller 21 is provided for receiving input 23 from a user or computer and automatically controlling the positioning system 15 and the measurement system 17 in response to the input 23. A measurement feedback system 25 provides feedback from measurements between the pivot 123 and the actuator 121 to the controller 21. The system 11 may further comprise a potentiometer 27 for adjusting a target set height via a change in the input. The system 11 also may further comprise adjusting the pivot 123 to a desired height, and sending a signal 29 to lock the pivot 123 in place relative to the actuator 121.

The present invention also comprises a method of dynamically adjusting a set height 19 of a pivot 123 relative to an actuator 121. One embodiment of the method comprises restraining one of the pivot 123 and the actuator 121, and measuring the set height 19 of the pivot 123 relative to the actuator 121. This latter step may comprise utilizing a laser-based measurement system 17 that has a voltage output that is linear along a tolerance of, for example, +/−0.015 mm, and is monitored and corrected to obtain a nominal voltage equal to whatever offset is required between the pivot 123 and the actuator 121.

The method also comprises receiving input 23 and automatically moving one of the pivot 123 and the actuator 121 relative to the other in response to the input 23. This step may comprise, for example, setting a distance from a mounting surface of the pivot 123 to a critical feature on the actuator 121, such that the distance is set to eliminate a tolerance stack-up between the pivot, the actuator, and any other intervening components. Finally, the method comprises providing feedback 25 from measurements between the pivot 123 and the actuator 121 to confirm a desired set height 19.

In addition, the method may further comprising adjusting a target set height via a change in the input 23, and/or adjusting the pivot 123 to a desired height, and then sending a signal 29 to lock the pivot 123 in place relative to the actuator 121.

The present invention advantageously uses an inexpensive and highly accurate probe that compensates for looser tolerances in various assembled parts. This system eliminates tolerance stack-up due to pivot set height. Once the positioning system precisely adjusts the pivot to the correct or desired height, the system stops and signals the operator or machine to lock the pivot into place. This solution offers a dynamic response rather than the static solutions of the prior art.

While the invention has been shown or described in only some of its forms, it should be apparent to those skilled in the art that it is not so limited, but is susceptible to various changes without departing from the scope of the invention.

What is claimed is:

1. A system for dynamically adjusting a set height of a pivot relative to an actuator along an axis, comprising:
   a fixture for restraining one of the pivot and the actuator for a disk drive having a disk, the actuator having an arm with a magnetic head for reading data from the disk;
   a positioning system for axially moving one of the pivot and the actuator relative to the other;
   a measurement system for measuring the set height of the pivot relative to the actuator;
   a controller for receiving input and automatically controlling the positioning system and measurement system in response to the input; and
   a measurement feedback system for providing feedback from measurements between the pivot and the actuator to the controller such that the positioning system axially adjusts said one of the pivot and the actuator relative to the other to form an assembly wherein the pivot and the actuator are joined together.

2. The system of claim 1, wherein the positioning system sets a distance from a mounting surface of the pivot to a critical feature on the actuator, such that the distance is set to eliminate a tolerance stack-up between the pivot, the actuator, and any other intervening components.

3. The system of claim 1, wherein the measurement system is a laser-based measurement system and has a voltage output that is linear along a tolerance of +/−0.015 mm, and is monitored and corrected by the controller to obtain a nominal voltage equal to whatever offset is required between the pivot and the actuator.

4. The system of claim 1, further comprising a potentiometer for adjusting a target set height via a change in the input.

5. An apparatus for dynamically adjusting a set height of a pivot relative to an actuator along an axis, comprising:
   a fixture adapted to restrain one of the pivot and the actuator for a disk drive having a disk, the actuator having an arm with a magnetic head for reading data from the disk;
   a positioning system adapted to axially move one of the pivot and the actuator relative to the other to form an assembly, wherein the positioning system sets a distance from a mounting surface of the pivot to a critical feature on the actuator, such that the distance is set to eliminate a tolerance stack-up between the pivot, the actuator, and any other intervening components;
   a measurement system adapted to measure the set height of the pivot relative to the actuator;
   a controller for receiving input and automatically controlling the positioning system and measurement system in response to the input;
   a measurement feedback system for providing feedback from measurements between the pivot and the actuator to the controller;
   a potentiometer for adjusting a target set height via a change in the input; and wherein
   the apparatus is adapted to axially adjust the pivot to a desired height by moving said one of the pivot and the actuator relative to the other to adjust and form an assembly wherein the pivot and the actuator are joined together, and send a signal to lock the pivot in place relative to the actuator.

6. The apparatus of claim 5, wherein the measurement system is a laser-based measurement system and has a voltage output that is linear along a tolerance of +/−0.015 mm, and is monitored and corrected by the controller to obtain a nominal voltage equal to whatever axial offset is required between the pivot and the actuator.

7. A system for dynamically adjusting a set height of a pivot relative to an actuator along an axis, comprising:
   a fixture for restraining the actuator for a disk drive having a disk, the actuator having an arm with a magnetic head for reading data from the disk;
   a positioning system for axially moving the pivot relative to the actuator and set a distance from a mounting surface of the pivot to a critical feature on the actuator, such that the distance is set to eliminate a tolerance stack-up between the pivot and the actuator;
   a measurement system for measuring the set height of the pivot relative to the actuator;
   a controller for receiving input and automatically controlling the positioning system and measurement system in response to the input;
   a measurement feedback system for providing feedback from measurements between the pivot and the actuator to the controller;
   a potentiometer for adjusting a target set height via a change in the input, such that the pivot is adjusted to a desired height by axially moving the pivot relative to the actuator to form an assembly wherein the pivot and the actuator are joined together, and sending a signal to lock the pivot in place relative to the actuator; and
   the measurement system comprising a laser-based measurement system and having a voltage output that is linear along a tolerance of +/−0.015 mm, and being monitored and corrected by the controller to obtain a nominal voltage equal to whatever axial offset is required between the assembled pivot and the actuator.

* * * * *

UNITED STATES PATENT AND TRADEMARK OFFICE
CERTIFICATE OF CORRECTION

PATENT NO.        : 7,543,371 B2
APPLICATION NO. : 10/874942
DATED             : June 9, 2009
INVENTOR(S)       : David Joseph Bagaoisan et al.

Page 1 of 1

It is certified that error appears in the above-identified patent and that said Letters Patent is hereby corrected as shown below:

Column 5, Line 1: delete "a" between eliminate and tolerance
Column 5, Line 1: add "an axial" between eliminate and tolerance
Column 5, Line 7: add "axial" between whatever and offset
Column 5, Lines 17-18: delete "to form an assembly"

Signed and Sealed this

Fourth Day of August, 2009

JOHN DOLL
*Acting Director of the United States Patent and Trademark Office*